(12) United States Patent
Chu et al.

(10) Patent No.: US 9,904,340 B2
(45) Date of Patent: Feb. 27, 2018

(54) MASTER ELECTRONIC DEVICE AND COMMUNICATION METHOD OF THE SAME

(71) Applicant: Nuvoton Technology Corporation, Hsinchu (TW)

(72) Inventors: Yung-Chen Chu, Hsinchu (TW); Chia-Ching Lu, Hsinchu (TW); Ming-Che Hung, Hsinchu (TW)

(73) Assignee: Nuvoton Technology Corporation, Hsinchu (TW)

( * ) Notice: Subject to any disclaimer, the term of this patent is extended or adjusted under 35 U.S.C. 154(b) by 58 days.

(21) Appl. No.: 15/146,903

(22) Filed: May 5, 2016

(65) Prior Publication Data

US 2017/0116143 A1  Apr. 27, 2017

(30) Foreign Application Priority Data

Oct. 26, 2015  (TW) .............................. 104135108 A

(51) Int. Cl.
| | |
|---|---|
| *G06F 1/26* | (2006.01) |
| *G06F 1/28* | (2006.01) |
| *G06F 13/36* | (2006.01) |
| *G06F 13/40* | (2006.01) |
| *G06F 13/362* | (2006.01) |

(52) U.S. Cl.
CPC ............... *G06F 1/26* (2013.01); *G06F 1/266* (2013.01); *G06F 1/28* (2013.01); *G06F 13/362* (2013.01); *G06F 13/4068* (2013.01)

(58) Field of Classification Search
CPC ... G06F 1/26; G06F 1/266; G06F 1/28; G06F 13/362; G06F 13/4068
See application file for complete search history.

(56) References Cited

U.S. PATENT DOCUMENTS

| | | | | |
|---|---|---|---|---|
| 7,312,635 | B2* | 12/2007 | Tanaka | H03K 19/0016 326/62 |
| 8,296,589 | B2* | 10/2012 | Hu | G06F 1/26 713/300 |
| 9,513,649 | B2* | 12/2016 | Won | G05F 1/66 |
| 9,569,389 | B2* | 2/2017 | Jeon | G06F 13/382 |
| 2010/0076616 | A1 | 3/2010 | Kagan | |

FOREIGN PATENT DOCUMENTS

TW        200639629        11/2006

* cited by examiner

*Primary Examiner* — Stefan Stoynov
(74) *Attorney, Agent, or Firm* — CKC & Partners Co., Ltd.

(57) ABSTRACT

A master electronic device used to perform communication with a slave electronic device is provided. The master electronic device includes a power module, an input and output (I/O) module, a processing module, a sample and hold module and a control module. The power module outputs power having a default operation voltage. The I/O module operates according to the power having the default operation voltage. The processing module controls the I/O module to generate and transmit a command signal to the slave electronic device. The sample and hold module receives and samples a response signal from the slave electronic device. The control module determines a slave operation voltage according to a high state voltage level of the response signal, so as to further control the power module to generate power having the slave operation voltage such that the I/O module operates accordingly.

14 Claims, 4 Drawing Sheets

MASTER ELECTRONIC DEVICE AND COMMUNICATION METHOD OF THE SAME

RELATED APPLICATIONS

This application claims priority to Taiwanese Application Serial Number 104135108, filed Oct. 26, 2015, which is herein incorporated by reference.

BACKGROUND

Field of Invention

The present disclosure relates to a communication technology. More particularly, the present disclosure relates to a master electronic device and a communication method of the same.

Description of Related Art

In a computer system, a system chip needs to be electrically coupled to a central processing unit to perform communication to accomplish a data exchange mechanism. However, under the rapid development of electronic technology, the system chip may be coupled to various central processing units of different generations. Usually, the central processing units of different generations operate according to different operation voltages. In order to keep the system chip and the central processing units operating under the same operation voltage, a common technique is to dispose an addition pin on, the system chip, and the addition pin is independent of the data transmission pins and coupled to the central processing unit to receive the voltage therefrom. However, the addition pin results in additional cost for the system chip having a gradually shrinking size. Some techniques need the user to adjust the voltage of the system manually. However, when the user is not able to make the adjustment, the problem of a poor integrity of the signal may still occur Accordingly, what needed is a master electronic device and communication method of the same to address the above issues.

SUMMARY

The present disclosure provides a master electronic device used to perform communication with a slave electronic device. The master electronic device includes a power module, an input and output (I/O) module a processing module, a sample and hold module and a control module. The power module is configured to output power having a default operation voltage. The I/O module is electrically coupled to the power module and is configured to operate according to the power having the default operation voltage. The processing module is electrically coupled to the I/O module and is configured to control the I/O module to generate and transmit a command signal to the slave electronic device though a single wire bi-directional path. The sample and hold module is configured to receive and sample a response signal from the slave electronic device though the single wire bi-directional path. The control module is electrically coupled between the sample and hold module and the power module and is configured to determine a slave operation voltage according to a high state voltage level of the response signal, so as to further control the power module to generate power having the slave operation voltage such that the I/O module operates according to the power having the slave operation voltage.

Another aspect of the present disclosure is to provide a master electronic device communication method used in a master electronic device used to perform communication with a slave electronic device. The master electronic device communication method includes the steps outlined below. Power having a default operation voltage is outputted by a power module such that an I/O module of the master electronic device operates according to the power having the default operation voltage. The I/O module is controlled to generate and transmit a command signal to the slave electronic device though a single wire bi-directional path by a processing module of the master electronic device. A response signal is received from the slave electronic device though the single wire bi-directional path and sampled by a sample and hold module of the master electronic device. A slave operation voltage is determined by a control module of the master electronic device according to a high state voltage level of the response signal. The power module is controlled to generate power having the slave operation voltage by the control module such that the I/O module operates according to the power having the slave operation voltage.

These and other features, aspects, and advantages of the present disclosure will become better understood with reference to the following description and appended claims.

It is to be understood that both the foregoing general description and the following detailed description are by examples, and are intended to provide further explanation of the disclosure as claimed.

BRIEF DESCRIPTION OF THE DRAWINGS

The disclosure can be more fully understood by reading the following detailed description of the embodiment, with reference made to the accompanying drawings as follows.

DETAILED DESCRIPTION

Figure 1:
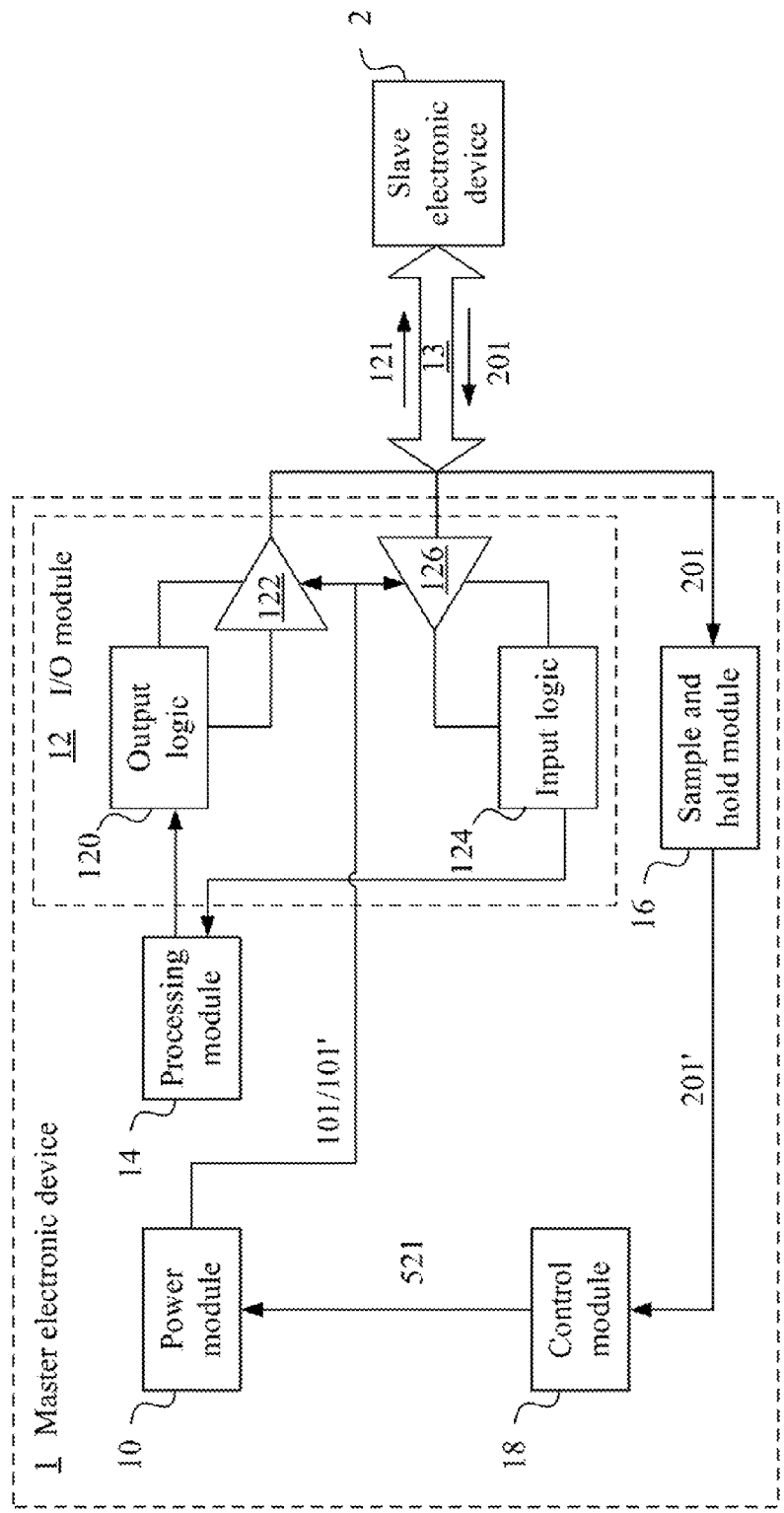
FIG. 1 is a block diagram of a master electronic device and a slave electronic device in an embodiment of the present disclosure.

Reference will now be made in detail to the present embodiments of the disclosure, examples of which are illustrated in the accompanying drawings. Wherever possible, the same reference numbers are used in the drawings and the description to refer to the same or like parts.

Reference is now made to FIG. 1. FIG. 1 is a block diagram of a master electronic device 1 and a slave electronic device 2 in an embodiment of the present disclosure.

In an embodiment, the master electronic device 1 and the slave electronic device 2 are a system chip and a central processing unit (CPU) respectively disposed in a computer system (not illustrated). The master electronic device 1 and the slave electronic device 2 can perform communication with each other. It is appreciated that in other embodiments, the master electronic device 1 and the slave electronic device 2 can be implemented by other electronic components and the present disclosure is not limited to the application of the system chip and the central processing unit.

The master electronic device 1 includes a power module 10, an I/O module 12, a processing module 14, a sample and hold module 16, and a control module 18.

Figure 2:
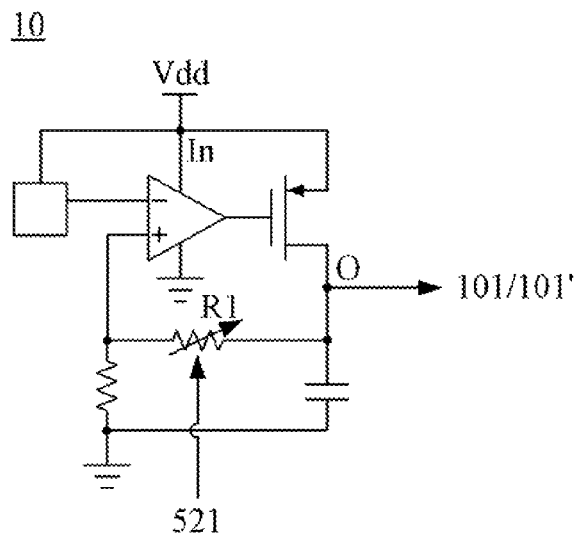
FIG. 2 is a detail circuit diagram of the power module in an embodiment of the present disclosure.

Reference is now made to FIG. 2. FIG. 2 is a detail circuit diagram of the, power module 12 in an embodiment of the present disclosure. In the present embodiment, the power module 10 is a low dropout regulator (LDO) and includes an input port In, an output port O and a trimmable resistor R1 electrically coupled to the output port O.

Under an initial state of the master electronic device 1, the trimmable resistor R1 is set to have a default resistance. The power module 10 receives a supply power Vdd from the input port In to perform power conversion to output a power 101 at the output port O. The supply power Vdd has a higher voltage level such as, but not limited to 3.3 volts. The power 101 has a default operation voltage having a lower voltage level such as, but not limited to 1.2 volts.

It is appreciated that the type, the configuration and the value of the default operation voltage of the power module 10 described above are merely an example. In other embodiments, other appropriate types and configurations can be used to implement the power module 10, and the default operation voltage can be set to other values.

The I/O module 12 is electrically coupled to the power module 10 and is configured to operate according to the power 101 having the default operation voltage. The I/O module 12 performs communication with the slave electronic device 2 through the single wire bi-directional path 13 under the control of the processing module 14.

The single wire bi-directional path 13 can be such as, but not limited to a platform environmental control interface (PECI) such that the master electronic device 1 and the slave electronic device 2 can perform the bi-directional communication of signal transmission and signal reception through the single wire of such a single wire bi-directional path 13. In an embodiment, a pin (not illustrated) electrically coupled to the single wire bi-directional path 13 can be disposed in the master electronic device 1 to serve as a port for the I/O module 12 to perform communication.

In an embodiment, the I/O module 12 includes an output logic 120 and an output buffer 122 for outputting signals, and an input logic 124 and an input buffer 126 for inputting signals. At least the output buffer 122 and the input buffer 126 are operated according to the power 101 having the default operation voltage.

The processing module 14 is electrically coupled to the I/O module 12 and is configured to control the I/O module 12 to generate and transmit a command signal 121.

Figure 3:
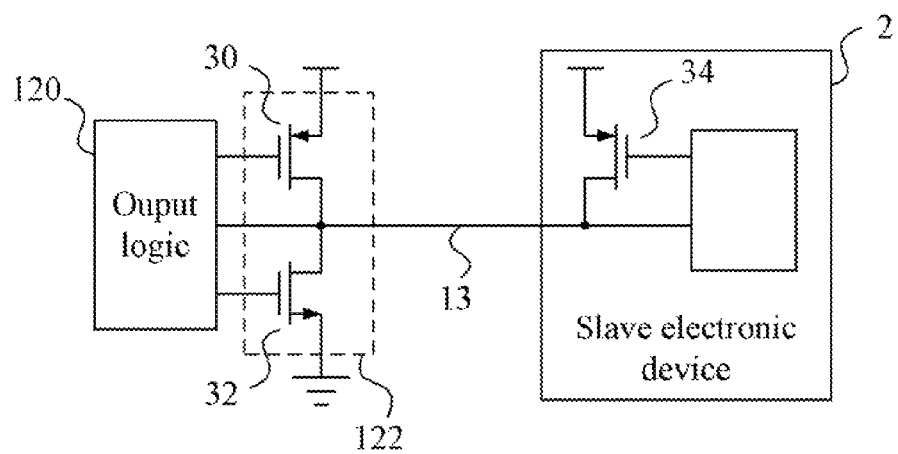
FIG. 3 is a diagram of the output logic, the output buffer, the single wire bi-directional path and the slave electronic device in an embodiment of the present disclosure.

Reference is now made to FIG. 3. FIG. 3 is a diagram of the output logic 120, the output buffer 122, the single wire bi-directional path 13 and the slave electronic device 2 in an embodiment of the present disclosure.

In an embodiment, the output buffer 122 includes a pull-up unit 30 and a pull-low unit 32. The processing module 14 controls the pull-up unit 30 and the pull-low unit 32 by controlling the output logic 120 to pull up or pull low the voltage level outputted by the output buffer 122, so as to generate the command signal 121. In an embodiment, the pull-up unit 30 and the pull-low unit 32 are a P-type transistor and an N-type transistor respectively. The gates of the pull-up unit 30 and the pull-low unit 32 are controlled by the output logic 120 to pull up or pull low the outputted voltage level. The command signal 121 generated accordingly is outputted to the slave electronic device 2 through the single wire bi-directional path 13.

In an embodiment, under an initial state of the master electronic device 1, the command signal 121 can be a ping command signal to determine whether the other end of the single wire bi-directional path 13 is coupled to the slave electronic device 2. However, the command signal 121 can also be other types of signals.

Through the single wire bi-directional path 13, the slave electronic device 2 transmits a response signal 201 for responding the command signs 121. In an embodiment, the slave electronic device 2 includes a pull-up unit 34 to pull up the outputted voltage level to generate the response signal 201 having a high state voltage.

Reference is now made to FIG. 1 again. In an embodiment, the I/O module 12 includes the input logic 124 and the input buffer 126 for receiving signals. The response signal 201 is transmitted through the input buffer 126 and the input logic 124 sequentially to the processing module 14 such that the processing module 14 performs other processing.

Besides, the sample and hold module 16 is configured to receive and sample the response signal 201 though the single wire bi-directional path 13.

Figure 4:
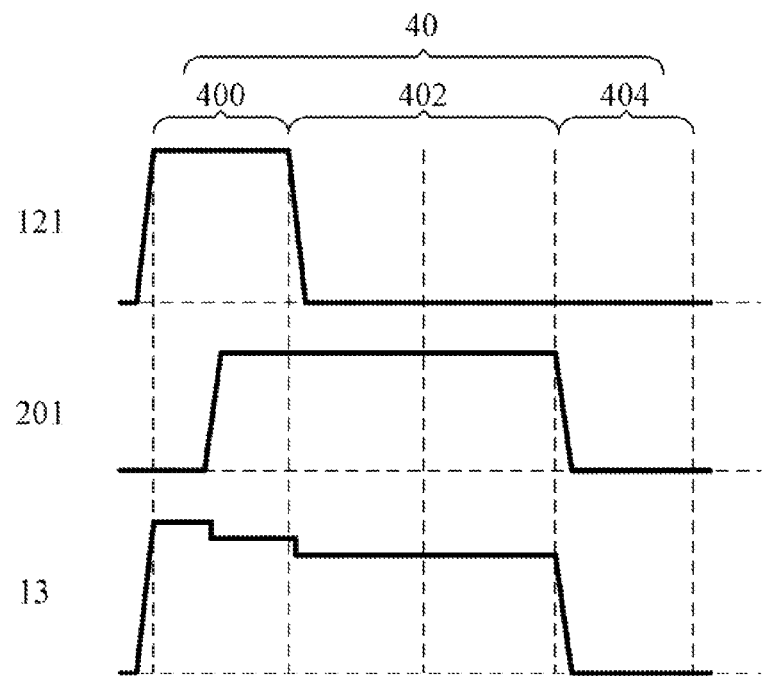
FIG. 4 is a timing diagram of the command signal, the response signal and the voltage on th e single wire bi-directional path in an embodiment of th present disclosure.

Reference is now made to FIG. 4. FIG. 4 is a timing diagram of the command signal 121, the response signal 201 and the voltage Vtotal on the single wire bi-directional path 13 in an embodiment of the present disclosure.

A data bit period 40 has a time section which the sample and hold module 16 is not affected by the command signal 121, and the sample and hold module 16 samples the response signal 201 during the time section.

As illustrated in FIG. 3, in a first time section 400 of the data bit period 40, the command signal 121 is at a high state, i.e. the level of the default operation voltage described above such as, but not limited to 1.2 volts. During a second time section 402 of the data bit period 40 after the first time section 400, the command signal 121 is at a low state.

In the first time section 400 after the command signal 121 is initialized as high state for a small section of time, the response signal 201 responds and is also at a high state, i.e. the level of the slave operation voltage such as, but not limited to 1.0 volt. The response signal 201 is kept as the high state in the second time section 402, and turns to the low state in a third time section 404 after the second time section 402.

In an embodiment, the first time section 400 described above is the first quarter of the data bit period 40, the second time section 402 is the second and third quarters of the data bit period 40 and the third time section 404 is the last quarter of the data bit period 40.

Under such a condition, the response signal 201 is at the high state during the first time section 400, but as illustrated in FIG. 4 the voltage Vtotal on the single wire bi-directional path 13 is an average of the command signal 121 and the response signal 201, which is 1.1 volts, under a condition that both of the command signal 121 and the response signal 201 are at the high state. As a result, the sample and hold module 16 is not able to sample the response signal 201 received from the single wire bi-directional path 13 correctly in the first time section 400. Thus, the sample and hold module 16 samples the response signal 201 in the second time section 402 which is not affected by the command signal 121 to obtain the actual voltage value of the response signal 201.

It is appreciated that the signals described above is merely an example. In other embodiments, the timing of the command signal 121 and the response signal 201 can be different depending on different communication protocols used between the master electronic device 1 and the slave electronic device 2.

The control module 18 is electrically coupled between the sample and hold module 16 and the power module 10. After the sample and hold module 16 samples the response signal 201, the control module 1 determines a slave operation voltage of the slave electronic device 2 according to the sampled response signal 201'.

Figure 5:
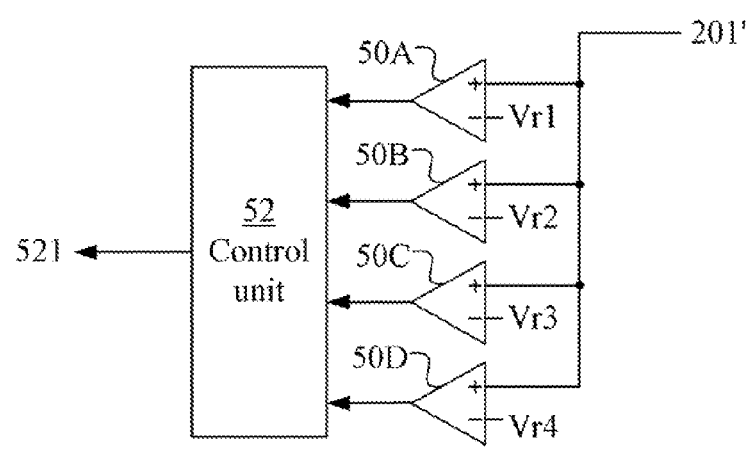
FIG. 5 is a detail diagram of the control module in an embodiment of the present disclosure.

Reference is now made to FIG. 5. FIG. 5 is a detail diagram of he control module 18 in an embodiment of the present disclosure. In an embodiment, the control module 18 includes four comparators 50A-50D and a control unit 52.

Each of the comparators 50A-50D is configured to perform comparison according to one of the reference voltages Vr1-Vr4 with the sampled response signal 201' respectively. For example, the comparators 50A-50D compares the sampled response signal 201 with the reference voltages Vr1-Vr4 of such as, but not limited to 1.18 volts, 1.08 volts, 1.03 volts and 0.95 volts respectively.

In an embodiment, after the comparison, the control unit 52 is configured to determine whether the sampled response signal 201' is smaller than the predetermined voltage level according to the comparison of the comparators 50A-50D. In an embodiment the predetermined voltage level is such as but not limited to 0.95 volts. When the sampled response signal 201 is than the predetermined voltage level, the control unit 52 determines that the response signal 201 does not have the high state voltage level. In other words, the response signal 201 generated by the slave electronic device 2 is at a low state.

Under such a condition, the sample and hold module 16 keeps receiving and sampling the response signal 201 from the slave electronic device 2 though the single wire bi-directional path 13 until the control module 52 determines that the response signal 201 has the high state voltage level according to the comparison of the comparators 50A-50D.

When the control module 52 determines that the sampled response signal 201' is not smaller than the predetermined voltage level according to the comparison results of the comparators 50A-50D, the control module 52 further determines the slave operation voltage according to the comparison results of the comparators 50A-50D. For example, when the slave operation voltage of the slave electronic device 2 is 1 volt, and the reference voltages Vr1-Vr4 corresponding to the comparators 50A-50D are 1.18 volts, 1.08 volts, 1.03 volts and 0.95 volts respectively, the comparison results of the comparators 50A-50D is (0, 0, 0, 1). The control unit 52 determines that the slave operation voltage is approximately 1 volt according to the comparison results described above.

Further, the control unit 52 generates a control signal 521 according to the slave operation voltage to control the power module 10 in FIG. 2 to output the power 101' having the slave operation voltage. In an embodiment, a decoder configured to decode the coded comparison results to generate the control signal 521 can be used to implement the control unit 52.

In an embodiment, the control signal 521 used to control the trimmable resistor R1 of the power module 10 in FIG. 2 such that the power module 10 outputs the power 101' having the slave operation voltage at the output port O by a manner of modifying the resistance of the trimmable resistor R1.

As a result, I/O module 12 can receive the power 101' having the slave operation voltage and operate accordingly. In an embodiment, in the I/O module 12, the output buffer 122 and the input buffer 126 are the main components to receive the power 101' having the slave operation voltage and operate accordingly. As a result, after the power 101' is generated to the I/O module all the high state signals transmitted from the I/O module 12 of the master electronic device 1 to the slave electronic device 2 and all the high state signals received by the I/O module 12 from the slave electronic device 2 have the same voltage level.

It is appreciated that the embodiment of the control module 18 described above is merely an example. In other embodiments, the control module 18 can be implemented by other configurations or can be integrated with the processing module 14 as a single module such that the processing module 14 can directly perform determination according to the sampled response signal 201' and control the power module 10.

In the embodiment, the advantage of the present disclosure is that the master electronic device 1 can determine the slave operation voltage according to the response signal 201 in response to the command signal 121 transmitted to the slave electronic device 2 by the master electronic device 1. The power module 10 of the master electronic device 1 can generate the corresponding power 101' subsequently. The master electronic device 1 and the slave electronic device 2 can perform communication by transmitting the signals having the same voltage level as the high state.

Figure 6:
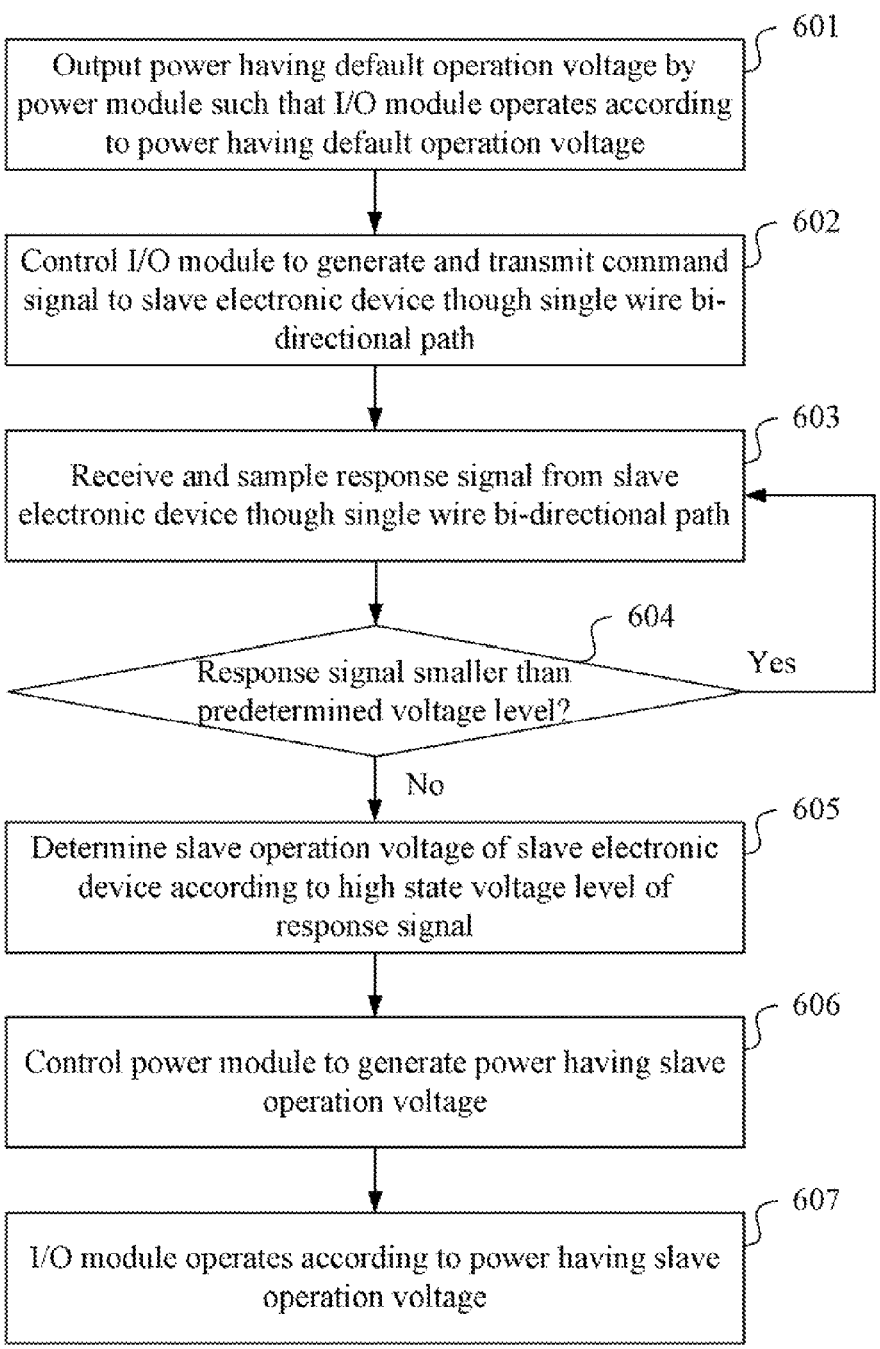
FIG. 6 is a flow chart of a master electronic device communication method in an embodiment of the present disclosure.

Reference is now made to FIG. 6. FIG. 6 is a flow chart of a master electronic device communication method 600 in an embodiment of the present disclosure. The master electronic device communication method 600 can be used in the master electronic device 1 illustrated in FIG. 1. The master electronic device communication method 600 includes the steps outlined below (The steps are not recited in the sequence in which the steps are performed. That is, unless the sequence of the steps is expressly indicated, the sequence of the steps is interchangeable, and all or part of the steps may be simultaneously, partially simultaneously, or sequentially performed).

In step 601, the power 101 having the default operation voltage is outputted by the power module 10 such that the I/O module 12 operates according to the power 101 having the default operation voltage. In an embodiment, after the master electronic device 1 is activated according to the supply power Vdd, the power module 10 generates the power 101 having the default operation voltage according to the supply power Vdd.

In step 602, the processing unit 14 controls the I/O module 12 to generate and transmit the command signal 121 to the slave electronic device 2 though the single wire bi-directional path 13. In an embodiment, the command signal 121 can be a connection status inquiring signal to determine whether the slave electronic device 2 is coupled to the single wire bi-directional path 13.

In step 603, the response signal 201 is received from the slave electronic device 2 though the single wire bi-directional path 13 and sampled by the sample and hold module 16.

In step 604, whether the sampled response signal 201' is smaller than the predetermined voltage level is determined by the control module 18. When the sampled response signal 201' is smaller than the predetermined voltage level, the flow goes back to step 603 to keep sampling.

When the sampled response signal 201' is not smaller than the predetermined voltage level, the flow goes to step 605 such that the slave operation voltage is determined by the control module 18 according to the high state voltage level of the response signal 201'.

In step 606, the power module 10 is controlled to generate power 101' having the slave operation voltage by the control module 18. In an embodiment, the control module 18 modifies the resistance of the trimmable resistor R1 of the power module 10 to accomplish the trimming of the power 101'.

In step 607, the I/O module 12 operates according to the power 101' having the slave operation voltage.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A master electronic device used to perform communication with a slave electronic device, wherein the master electronic device comprises:
    a power module configured to output power having a default operation voltage;
    an input and output (I/O) module electrically coupled to the power module and configured to operate according to the power having the default operation voltage;
    a processor electrically coupled to the I/O module and configured to control the I/O module to generate and transmit a command signal to the slave electronic device though a single wire bi-directional path;
    a sampler configured to receive and sample a response signal from the slave electronic device though the single wire bi-directional path; and
    a control module electrically coupled between the sampler and the power module, and configured to determine a slave operation voltage according to a high state voltage level of the response signal, so as to further control the power module to generate power having the slave operation voltage such that the I/O module operates according to the power having the slave operation voltage.

2. The master electronic device of claim 1, wherein the power module comprises an output port electrically coupled to the I/O module and a trimmable resistor electrically coupled to the output port, the control module is configured to control the trimmable resistor to trim a resistance thereof such that the output port outputs the power having the slave operation voltage.

3. The master electronic device of claim 1, wherein the power module is a low dropout regulator (LDO).

4. The master electronic device of claim 1, wherein the sampler is configured to sample the response signal during a time section of a data bit period, wherein the sampler is not affected by the command signal during the time section.

5. The master electronic device of claim 4, wherein the control module is configured to determine whether the sampled response signal is smaller than a predetermined voltage level such that the control module determines that the sampled response signal has the high state voltage level when the sampled response signal is not smaller than the predetermined voltage level to further determine the slave operation voltage according to the high state voltage level.

6. The master electronic device of claim 5, wherein when the sampled response signal is smaller than the predetermined voltage level, the control module determines that the sampled response signal does not have the high state voltage level such that the sampler keeps receiving and sampling the response signal from the slave electronic device though the single wire bi-directional path until the control module determines that the sampled response signal has the high state voltage level.

7. The master electronic device of claim 5, wherein the control module comprises:
    a plurality of comparators each configured to perform comparison according to a reference voltage and the sampled response signal; and
    a control unit configured to determine whether the sampled response signal is smaller than the predetermined voltage level according to the comparison of the comparators and to determine the slave operation voltage according to the comparison of the comparators when the sampled response signal is not smaller than the predetermined voltage level to further generate a control signal according to the slave operation voltage to control the power module to output the power having the slave operation voltage.

8. The master electronic device of claim 4, wherein the command signal is at a high state during a first time section of the data bit period and is at a low state during a second time section of the data bit period after the first time section, wherein the sampler samples the response signal in the second time section.

9. The master electronic device of claim 8, wherein the first time section is a 0 to ¼ time period section of the data bit period, and the second time section is a ¼ to ¾ time period section of the data bit period.

10. A master electronic device communication method used in a master electronic device used to perform communication with a slave electronic device, wherein the master electronic device communication method comprises:
    outputting power having a default operation voltage by a power module such that an I/O module of the master electronic device operates according to the power having the default operation voltage;
    controlling the I/O module to generate and transmit a command signal to the slave electronic device though a single wire bi-directional path by a processing module of the master electronic device;
    receiving and sampling a response signal from the slave electronic device though the single wire bi-directional path by a sample and hold module of the master electronic device;
    determining a slave operation voltage by a control module of the master electronic device according to a high state voltage level of the response signal; and
    controlling the power module to generate power having the slave operation voltage by the control module such that the I/O module operates according to the power having the slave operation voltage.

11. The master electronic device communication method of claim 10, wherein the power module further comprises an output port electrically coupled to the I/O module and a trimmable resistor electrically coupled to the output port, the master electronic device communication method further comprises:
    controlling the trimmable resistor by the control module to trim a resistance thereof such that the output port outputs the power having the slave operation voltage.

12. The master electronic device communication method of claim 10, further comprising:

sampling the response signal by the sample and hold module during a time section of a data bit period that is not affected by the command signal.

13. The master electronic device communication method of claim 12, further comprising:

determining whether the sampled response signal is smaller than a predetermined voltage level by the control module such that the control module determines that the sampled response signal has the high state voltage level when the sampled response signal is not smaller than the predetermined voltage level to further determine the slave operation voltage according to the high state voltage level.

14. The master electronic device communication method of claim 13, wherein when the sampled response signal is smaller than the predetermined voltage level, the master electronic device communication method further comprises:

determining that the sampled response signal does not have the high state voltage level by the control module; and keeping receiving and sampling the response signal from the slave electronic device though the single wire bi-directional path by the sample and hold module until the control module determines that the sampled response signal has the high state voltage level.

* * * * *